United States Patent [19]

Ogui

[11] 4,156,401

[45] May 29, 1979

[54] SEALED SELF-CLEANING AQUARIUM APPARATUS

[76] Inventor: William M. Ogui, 645 Walter St., New York, N.Y. 10002

[21] Appl. No.: 836,051

[22] Filed: Sep. 23, 1977

[51] Int. Cl.² ............................................. A01K 63/00
[52] U.S. Cl. ...................................................... 119/5
[58] Field of Search ............................. 119/5; 210/169

[56] References Cited

U.S. PATENT DOCUMENTS

| 2,594,474 | 4/1952 | McGrath | 119/5 |
| 2,981,228 | 4/1961 | Brandano | 119/5 X |
| 3,795,225 | 3/1974 | Ogui | 119/5 |

*Primary Examiner*—Hugh R. Chamblee
*Attorney, Agent, or Firm*—Albert F. Kronman

[57] ABSTRACT

A sealed liquid filled tank is carried above a liquid containing reservoir. A pump in the reservoir forces liquid upwardly through an interconnecting conduit into the tank. An overflow pipe in the tank directs the liquid back into the reservoir through filters. Fish feeding means are provided in the conduit so that food can be supplied to the tank without unsealing it.

7 Claims, 3 Drawing Figures

SEALED SELF-CLEANING AQUARIUM APPARATUS

BACKGROUND OF THE INVENTION

Aquariums, particularly large aquariums, require a great deal of attention in order to keep them clean. Frequently, they are drained completely for thorough cleaning to remove algae and foreign matter that collects therein and upon the walls of the aquarium. Failure to conduct thorough cleaning from time to time results in an unsightly display and may even cause loss of expensive fish and plants. In order to prevent fish from jumping out of the aquarium, screens or sheets of plastic or glass are frequently placed over the apparatus. Such covers must be removed for feeding. Excess food often remains in the aquarium and degrades the quality of the water.

It is an object of the present invention to overcome the shortcomings of prior known aquariums by providing a sealed liquid filled tank for the fish and aquatic plants.

Another object of the present invention is to provide an aquarium in which the water is continuously and vigorously circulated to supply air and purge the water within the tank.

Still another object of the present invention is to provide an aquarium in which feeding and cleaning operations are facilitated.

A further object of the present invention is to enhance the display of the aquatic life within the aquarium.

SUMMARY OF THE INVENTION

In the present invention, a sealed liquid filled tank having a bottom, top, and upstanding walls is carried upon support members. A liquid receiving reservoir is disposed beneath the tank. The reservoir also contains a submersible pump by means of which the liquid in the reservoir is pumped upwardly into the tank. An overflow pipe in the tank directs liquid back into the reservoir after passing it through filters. Food for fish and other aquatic animals is introduced into the tank through a tube connected to the pump feed line.

DESCRIPTION OF THE DRAWINGS

In the accompanying drawings forming part hereof, similar parts have been given the same reference numbers, in which drawings.

GENERAL DESCRIPTION

Figure 1:
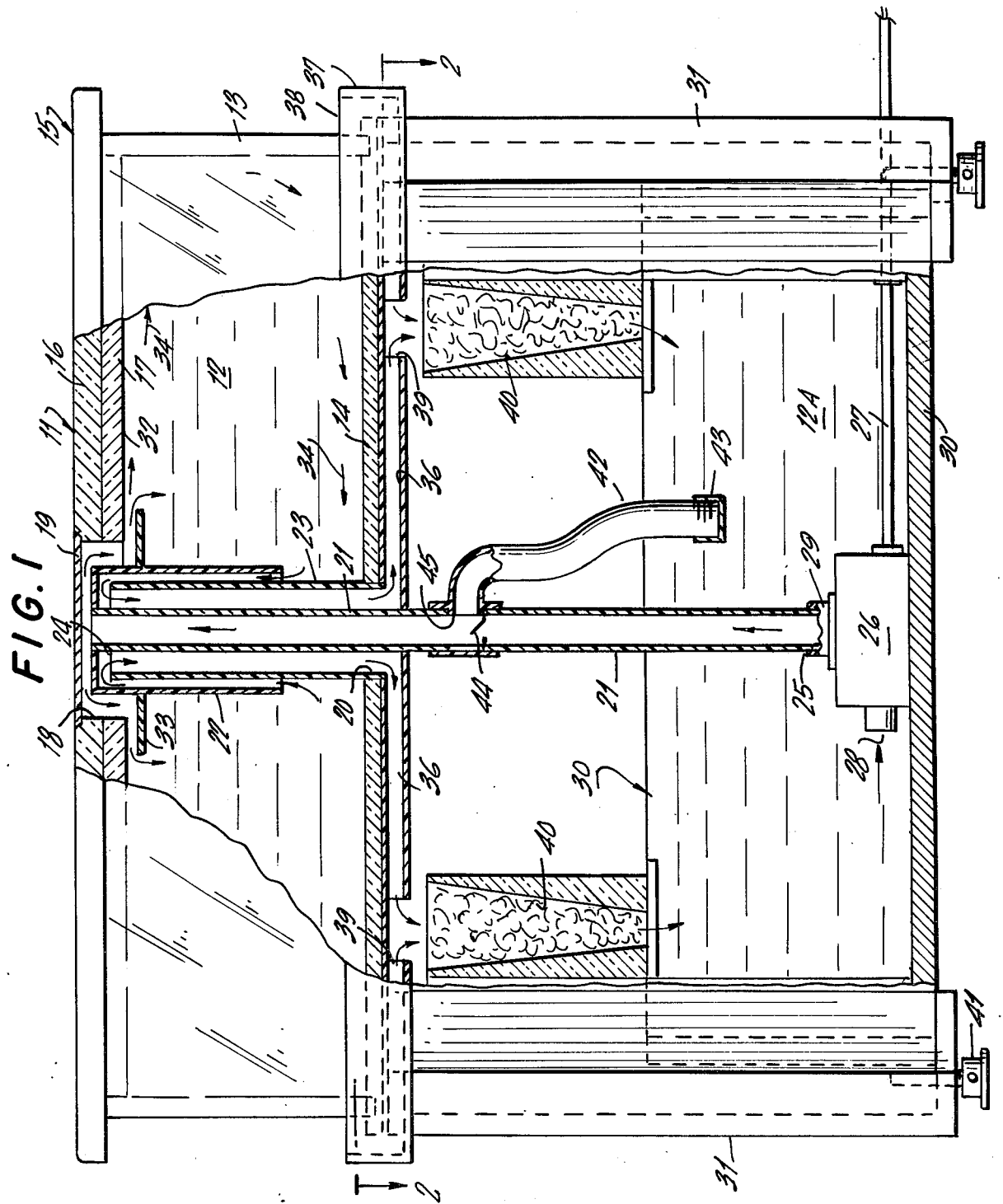
FIG. 1 is a view in front elevation partly broken away and partly in section of a complete embodiment of the present invention.
Figure 2:
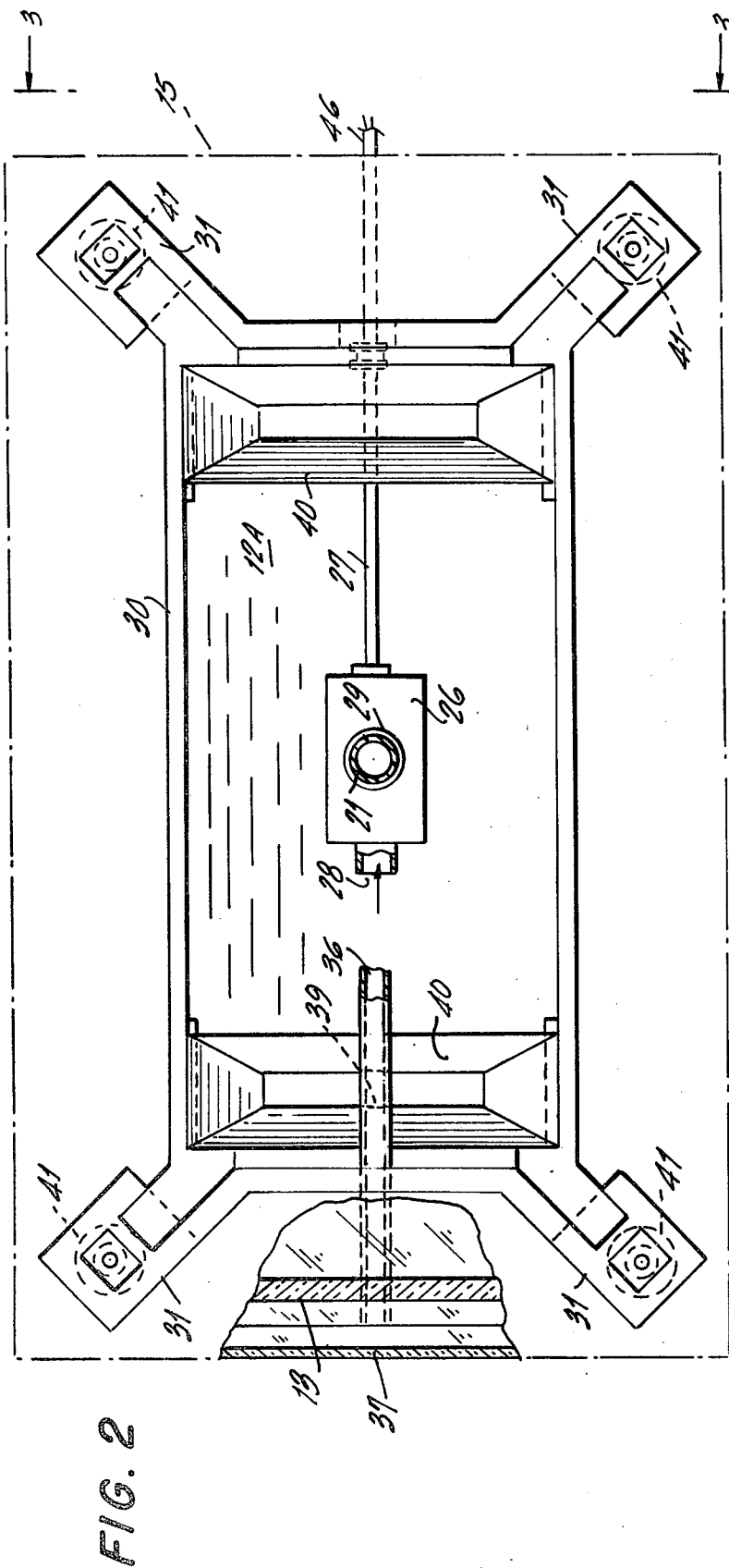
FIG. 2 is a view taken on line 2—2 in FIG. 1 looking in the direction of the arrows.

Referring to the drawings, there is shown a tank 11 adapted to receive a quantity of liquid 12 such as fresh or salt water. The tank 11 has upstanding sides of glass or plastic. While the description and drawings have been directed to a rectangular tank, it will be understood that other shapes such as cylindrical tanks, hexagonal tanks, or diamond shaped tanks may also be employed without departing from the spirit of the invention. The tank 11 is preferably made of heavy glass or some transparent plastic material.

A transparent or opaque bottom 14 underlies the sides 13 and is secured thereto in a manner which will insure a liquid tight joint. The top of the tank is provided with a cover 15 which overlies the sides 13 and is preferably made of a glass top plate 16 and an inner transparent cover plate 17. The inner plate is secured to the top plate by cementing, fusing, or some other well-known process to provide the effect of a unitary transparent cover. The plates 16, 17 are formed with an opening 18 therethrough into which a cap 19 of metal or plastic is pressed.

A lower opening 20 is formed in the bottom 14 to receive an inlet pipe 21. The lower opening 20 is substantially larger than the diameter of the inlet pipe 21 and an outlet conduit 23 which extends upwardly into the tank is secured at its lower end in the lower opening 20 to provide a fluid tight seal. The outlet conduit 23 is spaced from the inlet pipe 21 for a hereinafter more fully described purpose.

A baffle 22 is carried upon the end of the inlet pipe 23 as shown in FIG. 1. The baffle 22 has an aperature 24 in the top thereof through which liquid from the inlet pipe may pass into the tank. The baffle 22 is of a size which permits it to overlie the upper end of the outlet conduit 23 and be spaced from the top and sides thereof. As a result of this construction, several paths are provided for liquid to enter and leave the tank 11.

The lower end 25 of the inlet pipe 21 is coupled to a pump 26 having a feed water line 27. The feed water line 27 is attached to a source of liquid (not shown) to make-up for liquid loses due to evaporation in the reservoir 30. The pump 26 is also provided with an intake port 28 and the pump output port 29 is coupled to the bottom of the inlet pipe 21.

As shown in FIG. 1, the reservoir 30 is supported between upstanding legs 31 upon which the tank 11 is carried. The pump 26 is of the submersible type and serves to force the liquid 12a within the reservoir up through the inlet pipe 21 so that it flows over the top of the baffle 22. It will be noted that the top of the baffle 22 extends above the bottom 32 of the cover 15 so that when the tank is filled, there is no air space between the liquid 12 in the tank and the bottom of the cover 15. This feature improves the visibility through the top of the tank when it is in operation. The liquid flowing over the top of the baffle 22 moves downwardly and across the flange 33 which extends outwardly from the baffle 22. The flange 33 directs the liquid away from the center of the tank, a portion of which liquid circulates out to the sides 13. This circulating action, causes any foreign material floating within the tank to be moved toward the center of the tank and up through the space between the baffle 22 and the outlet conduit 23 as indicated by the arrows 34.

The liquid leaving the outlet conduit 23 moves into a duct 36 which is part of a tray 37. The tray underlies the tank 11 and is open at its top 38 to receive any liquid that may leak from or condense on the tank 11 and guide it into openings 39 in the bottom of said tray. Liquid leaving the outlet conduit 23 is also led into the openings 39 from which it drops into filters 40. The filters 40 are somewhat funnel shaped and filled with some suitable filtering material, which may be sand, activated charcoal granules or a combination thereof. The liquid from the filters 40 flows into the reservoir 12a from which it is again pumped up into the tank 11 as hereinabove described.

In order to insure that the tank 11 is level and that no air will get between the surface of the liquid 12 and the bottom surface of the cover 32, levelers 41 are secured to the bottom of the legs 31 as shown in FIG. 1.

When it is desired to feed fish or other aquatic animals within the tank 11, there is employed a flexible tube 42 having a cap 43 on one end thereof and in communication with the interior of the inlet pipe 21 above the reservoir 30 but beneath the tray 37. When not in use, the tube 42 is left hanging within the reservoir 30 as shown in FIG. 1. In order to add food to the tank 11, the tube 42 is picked up until the cap 43 is above the top of the tank 11. The motor 26 is turned off and a small flap valve 44 located adjacent the opening 45 in the inlet pipe 21 next to the tube 42, will close. The cap 43 may then be unscrewed or otherwise removed from the tube 42 and food placed in the said tube. When the cap is replaced and the tube lowered into the reservoir 30, as shown in FIG. 1, the pump is restarted and the liquid forced up the inlet pipe 21 will carry with it the food for the tank 11.

Figure 3:
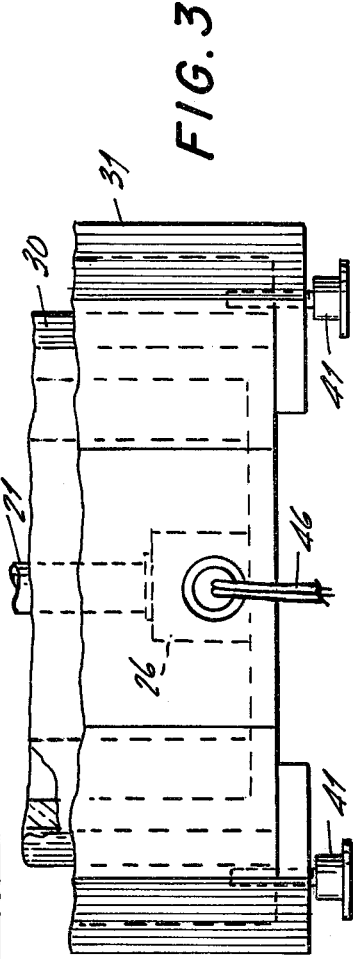
FIG. 3 is a fragmentary view taken on line 3—3 in FIG. 2 looking in the direction of the arrows.

In initially setting up the tank, liquid such as water is pulled into the reservoir 30 through the feed water line 27 and pumped up into the tank until the level desired has been reached. Once filled, the liquid coming through the feed water line 27 may be turned off be means of a valve (not shown). The fish and other aquatic animals and plants can be placed within the tank and thereafter, the cover 15 lowered into the position shown in FIG. 1. The circulating liquid 12, 12a provides the air necessary for the living animals and plants within the tank. The circulating water also keeps the tank free of foreign materials so that it does not require frequent cleaning. In addition, the filters 40 may be removed and cleaned from time to time without interrupting the flow of liquid. Since the pump 26 is of the submersible type, its operation is quiet and unobtrusive. Electrical power to the pump 26 is furnished by means of a power source indicated by the line 46 shown in FIG. 3.

From the foregoing, it will be seen that there has been provided a sealed, self-cleaning aquarium apparatus which will operate for extended periods of time without attention and which will display fish and aquatic plants most favorably.

Having thus fully described the invention, what is desired to be secured by Letters Patent is:

1. A sealed self-cleaning aquarium comprising a liquid receiving substantially sealed tank, a liquid receiving reservoir beneath the tank, a submerged pump carried within the reservoir, an inlet and an outlet port on the pump, an inlet pipe connected at one end to the inlet port of the pump and in communication with the interior of the tank, an outlet conduit carried within the tank around the outlet pipe and spaced therefrom said outlet conduit being in communication with the outside of the tank through said bottom opening at the bottom thereof, a tray carried beneath the tank and the outlet conduit and between the tank and the reservoir to receive liquid coming from the tank, at least one opening in the bottom of the tray overlying the reservoir and filters disposed beneath the tray openings and in communication with the interior of the reservoir to receive liquid coming from the tray opening and direct it into the reservoir.

2. An aquarium according to claim 1 in which the height of the inlet pipe within the tank will cause the liquid within the tank to displace any air between the said liquid and the bottom surface of the cover.

3. An aquarium according to claim 1 in which a baffle is carried upon the upper end of the inlet pipe, said baffle extending coaxially around the inlet pipe and the outlet conduit and spaced therefrom, and an opening in the top of the baffle in register with the top of the inlet pipe.

4. An aquarium according to claim 3 in which the baffle is formed with an outwardly extending flange located beneath but spaced from the bottom of the cover to direct liquid coming from the inlet pipe toward the sides of the tank.

5. An aquarium according to claim 4 in which the outlet conduit is carried at its lower end within the tank opening and is spaced at its upper end from the baffle.

6. An aquarium according to claim 5 in which the inlet pipe is provided with an elongated flexible tube having one end in communication with the interior of the inlet pipe beneath the tank and a closure on the free end of the flexible tube.

7. An aquarium according to claim 6 in which the inlet pipe is provided with a valve adjacent the flexible tube end in communication with said pipe.

* * * * *